United States Patent [19]
Truitt

[11] 3,820,064
[45] June 25, 1974

[54] AIRCRAFT COLLISION AVOIDANCE SYSTEM

[76] Inventor: Rolland D. Truitt, 2925-N.W. 14th Pl., Gainesville, Fla.

[22] Filed: Feb. 23, 1973

[21] Appl. No.: 335,053

[52] U.S. Cl.............. 340/25, 340/22, 340/213.1 R
[51] Int. Cl............................................. G08g 5/04
[58] Field of Search .... 340/22, 23, 25, 27 R, 213.1, 340/298, 313, 330, 366 F, 372; 179/1 VE

[56] References Cited
UNITED STATES PATENTS

| | | | |
|---|---|---|---|
| 2,278,939 | 4/1942 | Muehter | 340/213.1 |
| 2,634,406 | 4/1953 | Jones | 340/372 |
| 2,901,108 | 8/1937 | Sengebusch | 340/313 |
| 2,937,370 | 5/1960 | Dugan | 340/313 |
| 2,985,869 | 5/1961 | Arrasmith | 340/213.1 |
| 3,160,866 | 12/1964 | Meili | 340/313 |
| 3,251,049 | 5/1966 | Hallerberg | 340/213.1 |
| 3,382,439 | 5/1968 | Frihart | 179/1 VE |
| 3,430,224 | 2/1969 | Krantz | 340/313 |

Primary Examiner—Kathleen H. Claffy
Assistant Examiner—Randall P. Myers
Attorney, Agent, or Firm—Duckworth, Hobby & Allen

[57] ABSTRACT

A mid-air collision avoidance system for a passenger aircraft, including a passenger-actuated switch providing an input to an indicator in the cockpit, to warn the flight crew of an impending collision threat or other avoidable circumstance. Means are provided to indicate crew member acknowledgment of the passenger activated signal.

6 Claims, 1 Drawing Figure

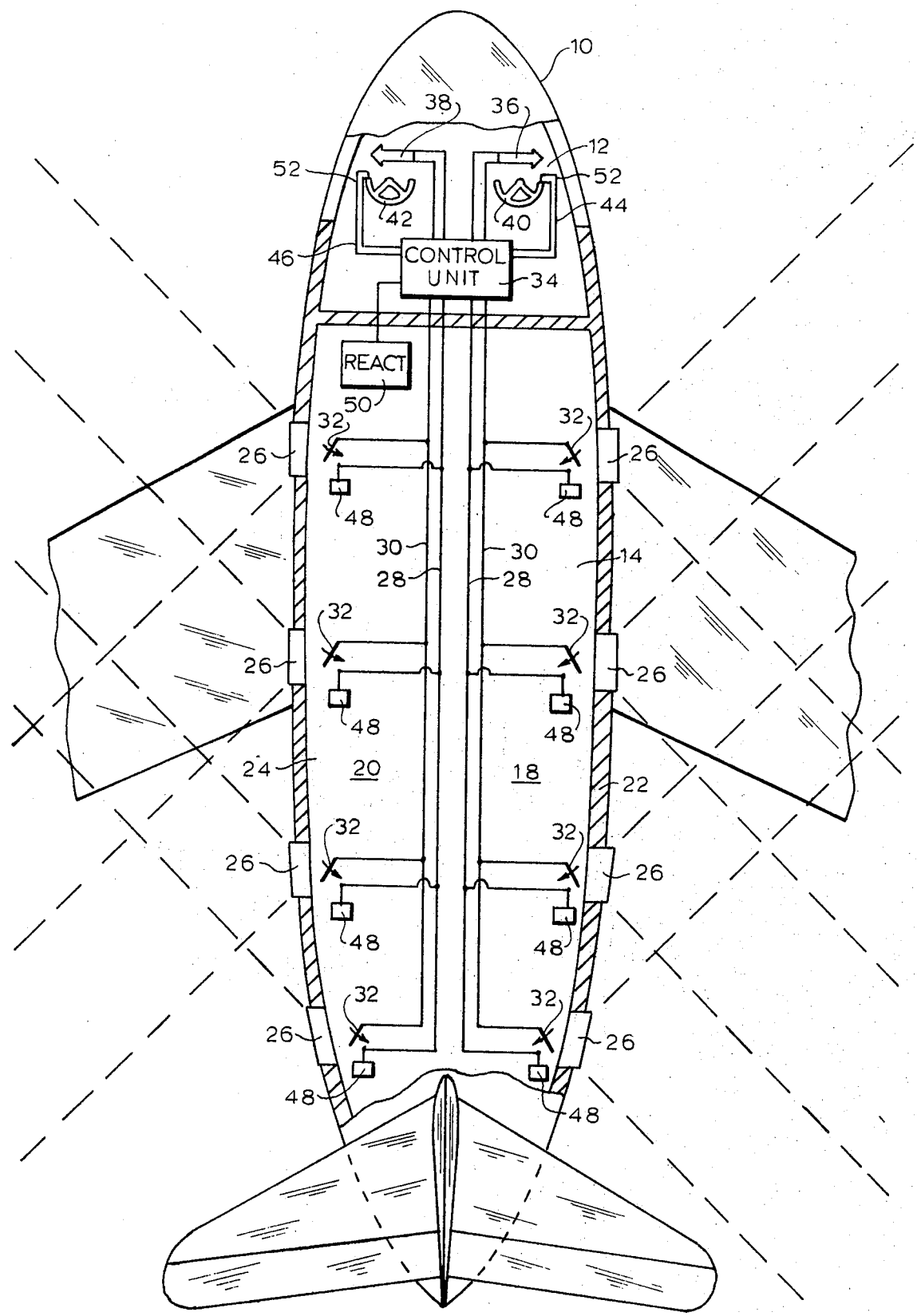

AIRCRAFT COLLISION AVOIDANCE SYSTEM

BACKGROUND OF THE INVENTION

1. Field of the Invention

The present invention relates to aircraft collision avoidance systems.

2. Description of the Prior Art

The present aircraft warning indicators and collision avoidance systems employ one way sensors or cooperative time/frequency sensing and transmitting equipment. See, for example, the following U.S. Pat. Nos. 2,960,679 to Atkins; 3,341,812 to Perkinson; 3,551,676 to Runnels; 3,614,728 to Borrok; and 3,652,981 to Campanella. All such systems require avionics, displays, or instrumentation ranging from the relatively simple to the fairly elaborate. Some prior art systems require expensive ground synchronization stations.

Such collision avoidance systems have always served as adjuncts to visual acquisition of potential collision threats. Yet increasingly, the flight crew is unable to visually acquire a potential collision threat in sufficient time to take proper evasive action. This is due primarily to the increased instrumentation work load which greatly increases the crew's "head down" time. The high closure rates of present-day aircraft and increases in air traffic densities in the VFR (visual flight rules) zone also lessen the opportunity for the crew to visually acquire a potential collision threat. It would therefore be useful to enlist the eyes of the passengers to aid the crew in visually acquiring such potential threats.

There are also other occurrences, such as in a skyjacking situation, in which a passenger may have a better opportunity to provide a timely response to a potential hazard.

INVENTION OBJECTIVES

It is axiomatic that a threat visually acquired in time to take appropriate response tends to lose its threat status. Pilot response is immediate: first by judging action required, if any; and second, by making a control input. But the key word is visual. Instrumentation to help avoid collisions has evolved precisely because visual acquisition is not taking place, or, is not taking place in time. Such avionics are adjuncts to the eyes, and putting them in the man-machine loop merely tends to increase the time between threat perception and avoidance action. The avionics are necessary, however, and necessary for the reason stated above, i.e., that visual acquisition is not taking place.

The reasons for the lack of visual perception are well known: increased cockpit workload which increases head down time; increased closure rates leading to lessened reaction time available, and; the continuing exponential increase in air traffic. The continual lowering of the floor of the Area of Positive Control also tends to increase air traffic density in the VFR zone — an already crowded area. Certain types of military operations and a great proportion of general aviation activities will continue to be conducted under VFR, and hence are being compressed into a smaller and denser regime.

Since it is generally admitted that a visually acquired threat tends to lose its threat status, why are not more eyes used? In the present situation, two pairs of eyes are responsible for the safety of up to hundreds of passengers. The eyes of the engineer can be effectively discounted for several reasons: his position in the cockpit which limits visual acquisition to the forward quadrant; his orientation in the cockpit which is generally towards the engineer's panel; and finally, his cockpit duties, which are primarily directed to managing systems rather than the traditional pilot duties of flying and looking. Much of the same may be said of the navigator if one is carried.

Even if the engineer does perceive the 12 o'clock threat so will at least one of the pilots, generally speaking, simply because their orientation is forward. It may be said, in fact, that if cockpit duites are being properly divided, the 12 o'clock threat will almost always be acquired. And it is naturally incumbent upon the pilot who perceives another aircraft at 12 o'clock to take appropriate action. So as a general rule, the 12 o'clock threat is not the threat that offers the greatest danger to the air carrier. The greatest collision threat is the threat from the beam quadrant. The verity of this statement will be seen in the light of the following postulates: (1) The frequency of occurrence rule, i.e., except for the true 12 o'clock to 12 o'clock, and 12 o'clock to 6 o'clock collision, one aircraft is approached from the beam. And as is generally the case, both victims approach each other from the beam. (2) The orientation rule, i.e., the further an object is displaced from the flight path axis, the less the likelihood that it will be acquired by the flight crew due simply to the crew's forward orientation. As a corollary, the flight crew's eyes tend to retain their forward orientation due to duties, habit and instruments. (3) And the rule carrying the heaviest implication and the most far reaching consequence is the relative movement rule, i.e., the facility with which an object will be visually acquired from the cockpit is inversely proportional to the collision danger it poses to the threatened aircraft. This is true because an object on a true collision course presents no movement in the sky. Presenting no line of sight rotation, the object tends to blend in with the background. This synergistic effect of actual danger and its attendant lack of perception, coupled with the fact that most glances in the beam are cursory, adequately serves to point out the hazard factor involved in a true collision course situation.

The biggest problem then is threat perception. If a method can be devised to increase the perception rate, then the danger of mid-air collision will be commensurately reduced. One method is to put the passenger in the air safety loop; to involve him in an area of his own self interest — that of his own personal safety. And it will follow that any action that a passenger takes to increase his own personal safety will have the effect of enhancing the safety factor for all aboard.

SUMMARY OF THE INVENTION

The present invention comprises a collision avoidance adapted for use with an aircraft of the type having separate crew and passenger compartments. The system includes signaling means adapted for mounting in the passenger compartment, and further adapted for actuation by at least one of the passengers. Indicating means is included with the system and is adapted to be secured in the crew compartment and responsive to an output from the signaling means. The system further includes responding means adapted to be positioned within the passenger compartment and responsive to an output from the crew compartment to indicate a crew response to an output from the indicating means.

THE DRAWING

The single FIGURE of the drawing is the top plan view, partially in block diagram and schematic, of a system in accordance with the present invention.

DETAILED DESCRIPTION

An aircraft collision avoidance system in accordance with the present invention will now be described with reference to the drawing. This embodiment is described as employed in an air collision avoidance environment. It will be understood by those skilled in the art, however, that the system of the present invention may also be employed in a variety of accident avoidance situations.

The system of the present invention is adapted for use with an aircraft 10 of the type having a crew compartment 12 and a passenger compartment 14 separated from each other, as by a partition 16, for example The aircraft 10 has starboard and port sides 22 and 24 respectively with a plurality of windows 26 positioned along each side.

Two separate signaling circuits 18, 20 are disposed in the passenger compartment 14. A first signaling circuit 18 is associated with the starboard side 22 of the aircraft 10, and the second signaling circuit 20 is associated with the port side 24 of the aircraft. Each signaling circuit 18, 20 includes two bus lines 28, 30 which are parallel-connected via a plurality of switches 32, each switch being physically positioned proximal to one of the windows 26. For example, the switches 32 may comprise push button switches which are located in the overhead light and ventilation control panels customarily employed in commercial aircraft, or may be located along the frame of the associated window 26.

The bus lines 28, 30 of each signaling circuit 18, 20 are coupled to a control unit 34, which is conveniently located in the crew compartment 12. With respect to the signaling circuits 18, 20, the control unit 34 may simply provide a voltage source, such that current flow occurs between the bus lines 28, 30 when anyone of the switches 32 is closed.

As shown in the drawing, starboard signaling circuit 18 is coupled through the control unit 34 to an indicator light 36, such as an arrow pointing in the starboard direction, for example. In a like manner the port signaling circuit 20 is coupled to a port-directed indicator arrow 38.

Co-located with each switch 32 is an indicating light 48 coupled with circuits 18,20, such that when an individual switch 32 is closed, the indicating light 48 associated with that switch illuminates. In one embodiment the switch 32 and light 48 are in the same housing as a push light housing, for example.

The aircraft 10 further comprises well-known steering means, including a first officer control wheel 40 and a pilot control wheel. Crew activated response means, such as anyone of a variety of well-known electromechanical switches 52, is coupled to each of the control wheels 40, 42 to provide an input via respective circuit lines 40, 44, 46 to a control unit 34 when one of the crew activates one of the response means. Actuation of a switch 52 on the control wheel 40 has the effect of breaking signalling circuit 18, thus extinguishing any and lights 48. The switch 52 on control wheel 42 has the same effect for the port side signalling circuit 20. Actuation of the switch 52 also extinguishes the appropriate cockpit warning light 36, 38 and rearms the system.

A cabin sign 50 is provided to inform passengers that the collision avoidance system is in operation. The cabin sign 50 is depicted as showing the acronym (REACT) for the system described herein. The acronym stands for REduce Air Collision Threat. It is understood that there may be a plurality of cabin signs 50. The sign 50 is controlled from the cockpit by means of an on-off switch (not shown).

The operation of this system will now be described. During flight, under reasonable visibility conditions, passengers located adjacent the windows 26 of the aircraft 10 are scanning the beam quadrant observable from their window, as shown by the dotted lines in the drawing. On occasion, one or more passengers may ascertain another aircraft which poses a potential collision threat, which threat is not seen by the crew. In such a situation, the passenger seated by the window 26, actuates the switch 32 adjacent thereto, to activate his indicator light 48 and the appropriate indicator light 36 or 38. The affected crewmember is thus notified to direct his visual scan pattern to the indicated quadrant. He simultaneously actuates his response switch 52 located on control wheel 40 or 42, which has the effect of: (1) extinguishing warning light 36 or 38 thus rearming the system, and (2) breaking circuit 18 or 20 thus extinguishing any or all respective side indicating lights 48.

Various other arrangements are within the scope of the present invention. For example, the cockpit warning lights 36, 38 may have two brightness modes, such that a single passenger actuation of a switch 32 will cause the appropriate side cockpit warning light 36 or 38 to illuminate in the dim note; whereas an actuation of a second switch 32 by another passenger on the same side of the aircraft will cause the appropriate side warning light 36 or 38 to translate from the dim to the bright side. This feature will have the effect of communicating to the affected crew-member that there exists a confirmed threat in the indicated quadrant. Furthermore, actuation of signalling switch 32 may activate a distinctive aural tone in the cockpit as an additional means of warning.

Further, actuation of the response switch 52 may activate a time delay relay which disables all signalling switches 32 and indicating lights 48 for that respective side of the aircraft for a period of 8 to 10 seconds or other appropriate time period. This feature will have the effect of eliminating excessive distraction onto a multiple reported threat whose existence has been acknowledged and whose position has been fixed.

I claim:

1. A visual warning system for aircraft of the type having separate pilot and passenger compartments, wherein a plurality of windows are spaced along opposite sides of said passenger compartment, said system comprising:

two separate signalling circuits, one of said circuits mounted along one side of said passenger compartment and the other signalling circuit mounted along the opposite side of said passenger compartment;

a plurality of switches along each circuit for energization thereof, each switch positioned at a window along the corresponding side;

two visual warning means, one warning means secured on one side of said pilot compartment and the other warning means secured on the other side of said pilot compartment, each coupled to said signalling circuit on the corresponding side for directing pilot attention to that side of said aircraft upon operation of one of said switches associated therewith; signal actuating means positioned in said pilot compartment; and indicating means positioned in said passenger compartment and coupled to said signal actuating means, said indicating means responsive to an output from said signal actuating means to indicate a pilot response to operation of one of said two warning means.

2. A visual warning system as recited in claim 1 wherein said aircraft includes steering means operated by said pilot, said system further comprising means coupling said signal actuating means in said pilot compartment to said steering means and responsive to operation of said steering means by said pilot.

3. A visual warning system as recited in claim 1, further comprising means in said pilot compartment for deactuating said two circuits.

4. A system as recited in claim 1 wherein said indicating means further comprises visual indicators co-located with said switching means.

5. A system as recited in claim 1 further comprising crew activated responding means for disabling at least a portion of said signaling means.

6. A system as recited in claim 5 whereiin said switching means comprises two separate sets of parallel-connected switches, each switch set being adapted to a corresponding side of said aircraft.

* * * * *